United States Patent
O'Connor et al.

(10) Patent No.: US 7,428,645 B2
(45) Date of Patent: Sep. 23, 2008

(54) METHODS AND APPARATUS TO SELECTIVELY POWER FUNCTIONAL UNITS

(75) Inventors: Dennis M. O'Connor, Chandler, AZ (US); Michael W. Morrow, Chandler, AZ (US); Lawrence T. Clark, Albuquerque, NM (US)

(73) Assignee: Marvell International, Ltd., Hamilton (BM)

(*) Notice: Subject to any disclaimer, the term of this patent is extended or adjusted under 35 U.S.C. 154(b) by 318 days.

(21) Appl. No.: 10/750,256

(22) Filed: Dec. 29, 2003

(65) Prior Publication Data

US 2005/0149769 A1    Jul. 7, 2005

(51) Int. Cl.
    G06F 1/26    (2006.01)
(52) U.S. Cl. .................. 713/300; 713/320; 713/323
(58) Field of Classification Search .......... 713/300–503
    See application file for complete search history.

(56) References Cited

U.S. PATENT DOCUMENTS

| | | | | |
|---|---|---|---|---|
| 5,634,131 A * | 5/1997 | Matter et al. | ................. | 713/322 |
| 5,983,321 A * | 11/1999 | Tran et al. | ................. | 711/125 |
| 6,061,775 A * | 5/2000 | Tran et al. | ................. | 712/1 |
| 6,076,146 A * | 6/2000 | Tran et al. | ................. | 711/125 |
| 6,219,796 B1 * | 4/2001 | Bartley | ................. | 713/320 |
| 6,282,663 B1 * | 8/2001 | Khazam | ................. | 713/320 |
| 6,367,006 B1 * | 4/2002 | Tran | ................. | 712/244 |
| 6,473,836 B1 * | 10/2002 | Ikeda | ................. | 711/137 |
| 6,772,355 B2 * | 8/2004 | Homewood et al. | ................. | 713/320 |
| 6,826,704 B1 * | 11/2004 | Pickett | ................. | 713/320 |
| 6,983,389 B1 * | 1/2006 | Filippo | ................. | 713/324 |
| 7,028,197 B2 * | 4/2006 | Subramanian et al. | ................. | 713/310 |
| 7,174,469 B2 * | 2/2007 | Luick | ................. | 713/300 |
| 2002/0138777 A1 * | 9/2002 | Feierbach | ................. | 713/324 |
| 2004/0221185 A1 * | 11/2004 | Bose et al. | ................. | 713/300 |
| 2004/0268091 A1 * | 12/2004 | Pessolano | ................. | 712/215 |
| 2005/0132243 A1 * | 6/2005 | Edwards | ................. | 713/300 |
| 2005/0251621 A1 * | 11/2005 | Theis | ................. | 711/118 |

OTHER PUBLICATIONS

Rotenberg, Eric, et al.; Trace Cache: a Low Latency Approach to High Bandwidth Instruction Fetching; IEEE: Published Proceeding for the 29th Annual International Symposium on Microacrchitecture, Dec. 2-4, 1996.*

IEEE 100: The Authoritative Dictionary of IEEE Standards Terms, 7$^{th}$ Ed.; IEEE Press Publications; 2000; ISBN: 0-7381-2601-2.*

* cited by examiner

Primary Examiner—Nitin C. Patel

(57) ABSTRACT

A processing engine fetches one or more lines of software instructions into an instruction cache. Based on the contents of the cache, potentially needed functional units are identified as functional units that are operable to execute at least one software instruction stored within the instruction cache. Unneeded functional units are identified as functional units that are not operable to execute a software instruction stored within the instruction cache. A power increase is initiated for selected ones of the potentially needed functional units that are determined to be in a low power state. A power decrease is initiated for selected ones of the unneeded functional units that are determined to be in an operable power state.

38 Claims, 9 Drawing Sheets

|   |      | 621 | 622 |   | 624 |   |   |
|---|------|-----|-----|---|-----|---|---|
| 0 | LINE | 1 | 1 | 0 | 0 | 1 | 0 |
| 1 | LINE | 1 | 1 | 0 | 1 | 0 | 0 |
| 2 | LINE | 1 | 0 | 0 | 0 | 0 | 0 |
| 3 | LINE | 0 | 0 | 0 | 0 | 1 | 0 |
|   | ...  | ... | | | | | |
| n | LINE | 1 | 0 | 0 | 0 | 1 | 0 |

612 points to the table. 620 brackets the right-side columns.

FIG. 6

|                   | 720 | 730 |
|-------------------|-----|-----|
| FUNCTIONAL UNIT A | 1 | 4 |
| FUNCTIONAL UNIT B | 1 | 2 |
| FUNCTIONAL UNIT C | 0 | 0 |
| FUNCTIONAL UNIT D | 1 | 1 |
| FUNCTIONAL UNIT E | 1 | 3 |
| FUNCTIONAL UNIT F | 0 | 0 |

FIG. 7

METHODS AND APPARATUS TO SELECTIVELY POWER FUNCTIONAL UNITS

TECHNICAL FIELD

The inventive subject matter pertains to methods and apparatus to reduce power dissipation in an electronic system and, more particularly, to methods and apparatus to reduce power dissipation by selectively powering up and powering down functional units within an electronic system.

BACKGROUND

During execution of a software module, a microprocessor executes software instructions associated with the module. Each instruction may call upon the microprocessor to perform some task. A plethora of possible tasks exists. For example, some tasks include moving data to or from a storage medium or register, performing various mathematical or data processing tasks, controlling portions of the microprocessor or other devices, monitoring various parameters, and responding to interrupts and other messages.

In performing a task, a microprocessor utilizes one or more hardware functional units (e.g., a floating-point unit). Some functional units are called upon frequently, and others are called upon rarely. Regardless of the frequency of their use, the functional units are maintained in a powered-up state while the microprocessor is actively executing a module. This enables a functional unit to be ready for use when an instruction that requires the functional unit is executed by the microprocessor.

Each functional unit consumes a certain amount of power. Some power is consumed while the functional unit is performing a task or waiting to perform a task, and some power is dissipated through leakage. In portable devices, this power often is supplied from a battery source. Because the amount of power that a battery can supply between charges is limited, the amount of time that a system can be used between charges also is limited. For example, a laptop computer battery may only be able to provide one or two hours worth of use before a recharge is needed.

Battery life is an increasingly important consideration in the portable device marketplace. For this reason, designers increasingly concern themselves with reducing power consumption and dissipation within electronic systems. Accordingly, what are needed are methods and apparatus that reduce power dissipation within an electronic system. Further needed are methods and apparatus that reduce power dissipation within an electronic system, which includes multiple functional units used by a processor to execute software instructions.

BRIEF DESCRIPTION OF THE DRAWINGS

The appended claims point out, with particularity, different embodiments of the inventive subject matter described herein. However, the detailed description presents a more complete understanding of various embodiments of the inventive subject matter when considered in connection with the figures, wherein like-reference numbers refer to similar items throughout the figures and:

FIG. 6 is a second example of the instruction cache of FIG. 4, in accordance with an embodiment of the invention;

FIG. 7 is a second example of the functional unit status table of FIG. 5, in accordance with an embodiment of the invention;

DETAILED DESCRIPTION

Various embodiments of the inventive subject matter described herein provide methods and apparatus to reduce power dissipation within an electronic system. Embodiments of the inventive subject matter may be referred to, individually and/or collectively, herein by the term "invention" merely for convenience and without intending to voluntarily limit the scope of this application to any single invention or inventive concept if more than one is in fact disclosed.

Further provided by various embodiments are methods and apparatus to reduce power dissipation within an electronic system, which includes multiple functional units that are used by a processor to execute software instructions. Embodiments of the invention can be used in portable and non-portable systems. Within portable systems (e.g., mobile telephones, laptop computers, personal data assistants, pagers, etc.), embodiments of the invention can be used to extend battery life by reducing power consumption and dissipation.

Various embodiments involve selectively increasing power and/or decreasing power to functional units that are used by one or more processing engines to perform tasks associated with software instructions. In various embodiments, determinations of whether to power-up or power-down a functional unit are made based on instructions within an instruction cache.

The term "power-up," as used herein, means to increase a level of power provided to a functional unit. In one embodiment, the level of power is increased to a level that enables the functional unit to perform a task associated with a software instruction. The term "power-down," as used herein, means to decrease a level of power provided to a functional unit. In one embodiment, the level of power is decreased to a level approximately equal to ground. In another embodiment, the level of power is decreased to a standby voltage, which is greater than ground, and which can be different for each functional unit.

Figure 1:
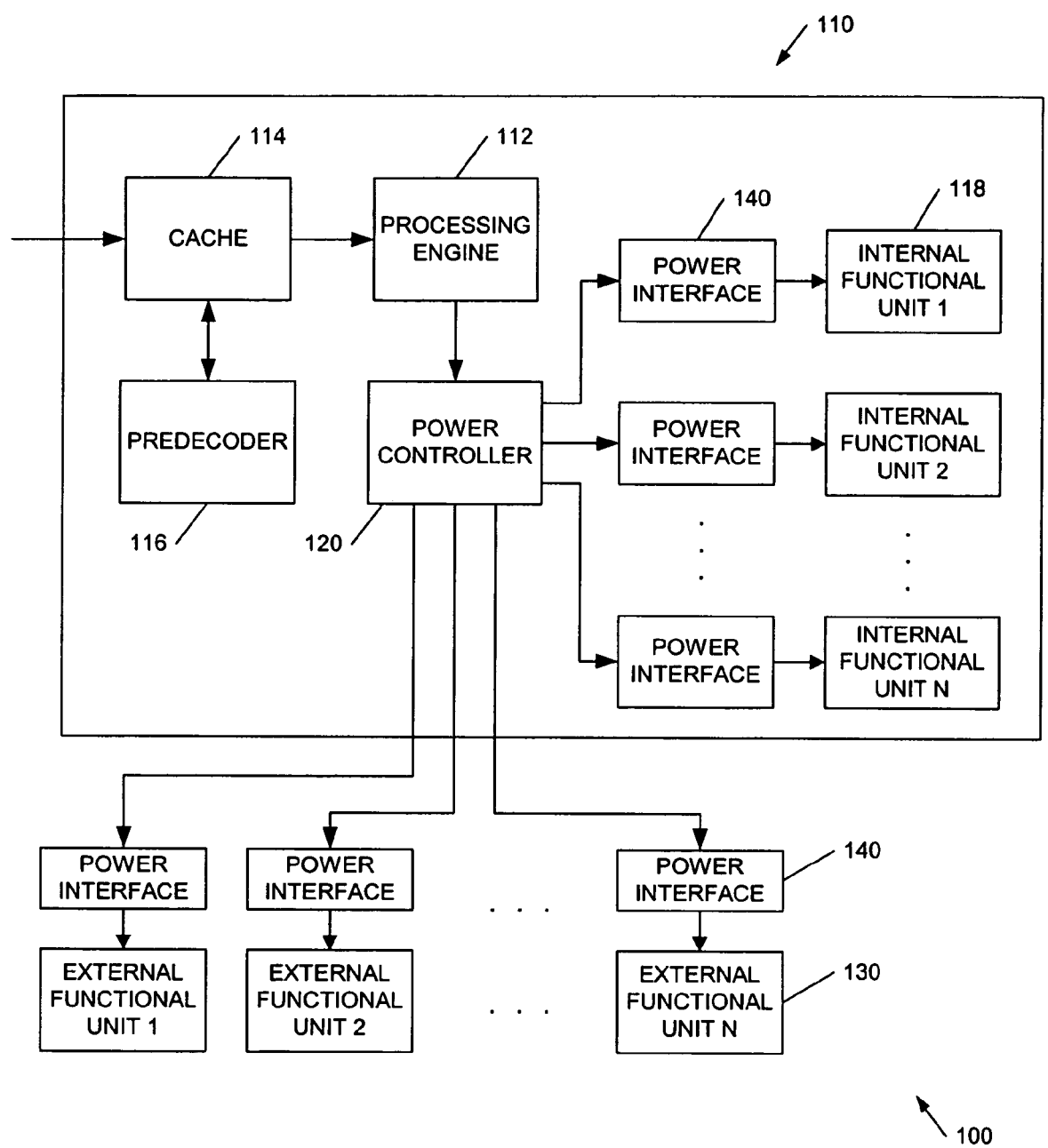
FIG. 1 is a simplified block diagram of an electronic system, in accordance with an embodiment of the invention.

FIG. 1 is a simplified block diagram of an electronic system 100, in accordance with an embodiment of the invention. System 100 includes one or more processor subsystems 110, in one embodiment. Processor subsystem 110 includes one or more processing engines 112, one or more caches 114, and one or more predecoders 116, in one embodiment.

The term "cache," as used herein, refers to a temporary storage space, which includes multiple locations to store software instructions. In one embodiment, each of the multiple locations is capable of storing a "line" of instructions. A "line" of instructions is defined herein as a set of one or more instructions, which are fetched from another storage entity and stored together in a cache location.

A cache can be a traditional cache, a trace cache or another type of cache, in various embodiments. In one embodiment, cache 114 is an "on-board" cache, meaning that the cache 114 is located on the same chip as processing engine 112. In other embodiments, cache 114 and/or predecoder 116 can be located on one or more separate chips from processing engine 112.

During operation, processing engine 112 "fetches" one or more lines of instructions from another storage entity into cache 114. The instructions are fetched from higher cache levels and/or from other information storage media. For example, but not by way of limitation, instructions can be fetched from read only memory (ROM), random access memory (RAM), removable storage media (e.g., CD ROM, floppy disk), and/or remote storage media (e.g., other networked computers or devices).

The fetched instructions are evaluated by predecoder 116, in one embodiment. Predecoding occurs before or as the instruction comes into the cache 114. In various embodiments, predecoder 116 evaluates each instruction sequentially or evaluates multiple instructions in parallel. The instruction evaluation includes, in one embodiment, determining which functional unit (or units) an instruction may need in order to be executed.

In one embodiment, predecoder 116 represents this determination by generating an "information vector" for each instruction or line of instructions. As will be described in detail below, the information vector is used to determine whether and when to power-up or power-down a particular functional unit. In other embodiments, an information vector is not stored for each instruction or line of instructions.

Lines that have been fetched by the processor into the cache 114 are then available for the processor engine 112 to execute. In one embodiment, processor engine 112 first "activates" a line that it intends to access. The processor engine 112 can then activate or access particular words within the line, where each word can represent an instruction or a portion of an instruction. When the processing engine 112 retrieves an instruction from the cache 114, the instruction is considered to be "issued." While the processing engine 112 is in the process of executing the instruction, the instruction is considered to be "in-flight."

In various embodiments, processing engine 112 sends specialized instructions to one or more internal functional units 118 and/or external functional units 130 in order to execute some types of instructions. The term "functional unit," as used herein, means a portion of hardware, which is capable of performing a function in response to special instructions received from a processing engine (e.g., engine 112). Each functional unit 118, 130 can include hardware associated primarily with that functional unit, or a functional unit can "share" some or all of its associated hardware with one or more other functional units. A particular functional unit can be configured to perform a single type of function (e.g., a special-purpose unit), or a functional unit can be a multi-purpose or general-purpose type of unit, which can perform more than one type of function.

Numerous varieties of functional units 118, 130 can be included within system 100. For example, but not by way of limitation, functional units 118, 130 can include floating-point units, multipliers, dividers, shifters, digital signal processors, co-processors, application specific integrated circuits (ASICs), data processing engines, debug logic blocks, encryption units, key-generation units, and other types of units.

An "internal functional unit" 118 is a unit that is located on the same chip as the processing engine 112. In contrast, an "external functional unit" 130 is a functional unit that is located on a different chip from the processing engine 112. In the illustrated embodiment, the system 100 includes both external and internal functional units. In other embodiments, system 100 includes either internal functional units 118 or external functional units 130, but not both.

Each functional unit 118, 130 directly or indirectly receives power from a power source (not shown). For example, a power source can be a battery or a continuous source of power. Accordingly, in one embodiment, a power interface 140 is associated with each functional unit 118, 130. A power interface 140 can include a single gate or switch, or a power interface 140 can be more complicated. For example, but not by way of limitation, a power gate may be a P-channel metal-oxide-semiconductor (PMOS) connecting a first voltage supply to a circuit that is being gated, or an N-channel MOS (NMOS) connecting a second voltage supply to the circuit, a combination thereof, or a different type of gate/power configuration. For illustration purposes, FIG. 1 shows a power interface 140 for each functional unit 118, 130. In other embodiments, a power interface 140 can be used to selectively provide power to more than one functional unit.

In one embodiment, processor subsystem 110 also includes a power controller 120. Power controller 120 can be integrated with or separate from processing engine 112. For ease of description and illustration, power controller 120 is shown as a separate element.

In one embodiment, power controller 120 makes various determinations of whether to power-up or power-down the various functional units 118, 130. In various embodiments, power-up and power-down determinations are made based on the contents of a first layer (e.g., "L1") instruction cache (i.e., an on-board cache from which the processing engine directly retrieves instructions). In other embodiments, the contents of higher cache layers (e.g., L2, L3, etc.) can be used for power-up and/or power-down determinations.

Power controller 120 affects the states of power interfaces 140 in response to the power-up and power-down determinations. For example, if a determination is made to power-up a functional unit, power controller 120 causes the respective power interface 140 to provide an operable level of power to the functional unit. When a functional unit is receiving an operable level of power, the unit is considered to be in an "operable power state." An operable power level is a level that falls within a range of power levels, in one embodiment, from an intermediate power level, which enables the device to perform relatively-low voltage operations, to a higher level, which coincides approximately with the high end of the operable power specifications.

Conversely, if a determination is made to power-down a functional unit 120, power controller 120 causes the respective power interface 140 to provide a reduced level of power to the functional unit, referred to herein as a "low power level." When a functional unit is receiving a low power level, the unit is considered to be in a "low power state." The low power level is a power level that is less than an operable power level. In one embodiment, power is substantially completely removed from the functional unit. In another embodiment, power is not completely removed, but instead is reduced to a stand-by or low power level.

In one embodiment, power controller 120 affects power interfaces 140 based on commands and/or signals received from processing engine 112. In other embodiments, power controller 120 affects power interfaces 140 based on information and/or signals received from cache 114 and/or predecoder 116. Various embodiments of procedures and structures used in the process of selectively powering on and powering off the functional units are described in conjunction with FIGS. 2-10. It is to be understood that the procedure blocks can be performed by processing engine 112, predecoder 116, power controller 120, other processing devices (not shown), or combinations of these devices. In addition, the order and or functionality of the procedure blocks can be modified, while still producing the same result, as will be obvious to those of skill in the art, based on the disclosure herein.

Figure 2:
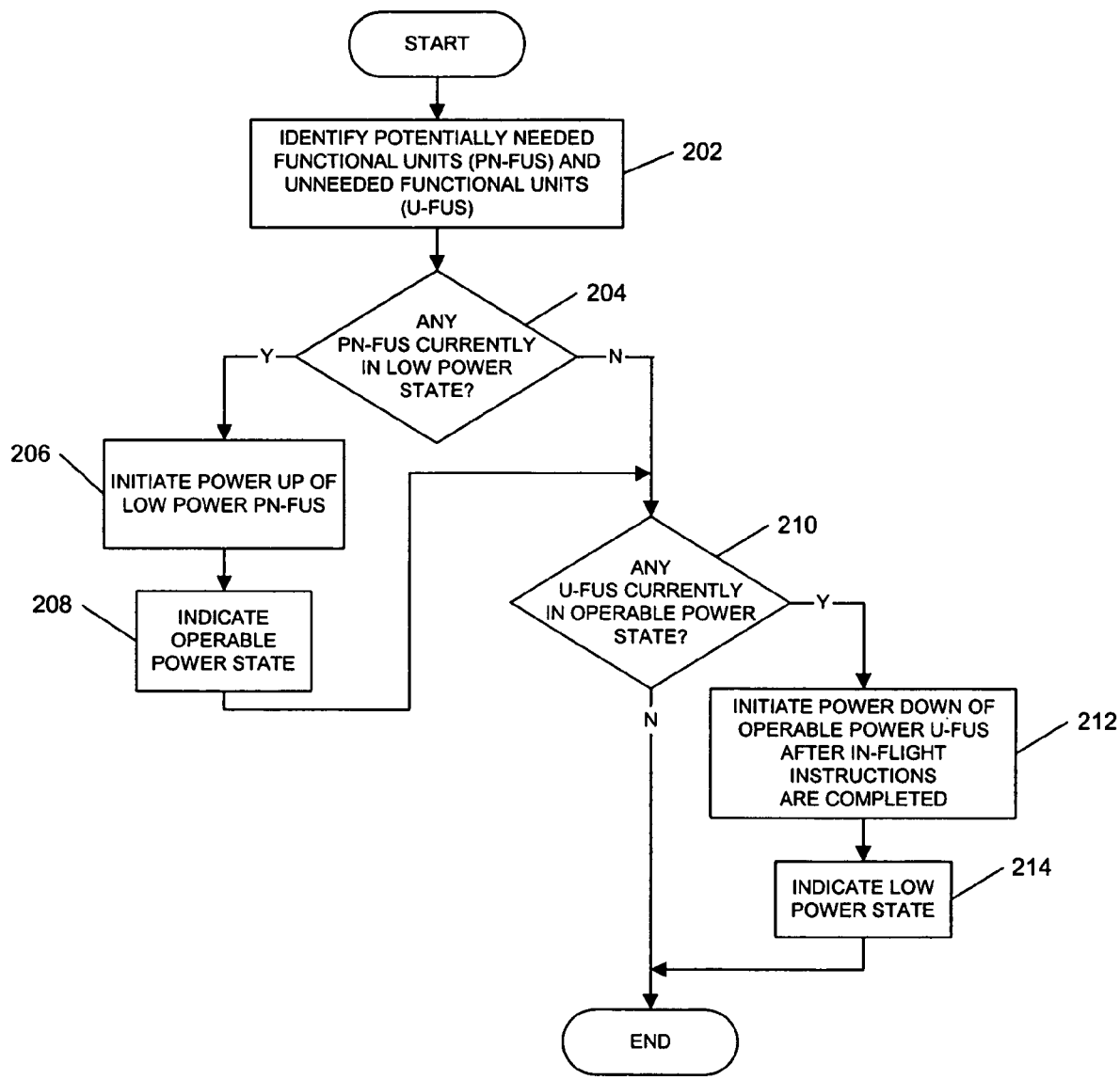
FIG. 2 is a flowchart of a procedure for selectively powering functional units, in accordance with an embodiment of the invention.

FIG. 2 is a flowchart of a procedure for selectively powering functional units, in accordance with an embodiment of the invention. Portions of the method can be performed by processing engine 112 (FIG. 1), predecoder 116, power controller 120, other processing elements (not shown), or combinations thereof.

The method begins, in block 202, by identifying "potentially needed functional units" (PN-FUS) and "unneeded functional units" (U-FUS). In one embodiment, if an instruction anywhere in the cache may need a particular functional unit in order to be executed, then that functional unit is identified as a PN-FU. In another embodiment, if an instruction within a subset of cache locations (e.g., at least one but fewer than all locations) may need a particular functional unit, then that functional unit is identified as a PN-FU. Similarly, in one embodiment, if no instructions exist within the cache or within a subset of cache locations, which may need a particular functional unit in order to be executed, then that functional unit is identified as a U-FU.

In various embodiments, the identifications of PN-FUS are made as instructions are fetched into the cache, as a cache line is activated, when instructions within a cache line are retrieved for execution by the processing engine, periodically, and/or at other times. The identifications of U-FUS are made when cache lines are eliminated from the cache (e.g., evicted, issued, erased or replaced), when a cache line is de-activated, when in-flight instructions are completed, periodically, and/or at other times.

In one embodiment, PN-FUS and U-FUS are identified by evaluating one or more information vectors (see element 420, FIG. 4) associated with one or more locations within the cache. In another embodiment, the instructions themselves, within one or more cache locations, are evaluated to determine which functional units may be needed if the instructions are executed, and which functional units are not needed. In still another embodiment, use counters (see element 530, FIG. 5) within a functional unit status table (see table 500, FIG. 5) are evaluated to determine if any instructions within the cache (or a subset thereof) may use the various functional units. Each of these embodiments will be described in more detail later.

Referring again to FIG. 2, in block 204, a determination is made whether any identified PN-FU has a present power level, which indicates that the PN-FU is currently in a low power state. In one embodiment, this determination is made by evaluating a "power status" indicator (see element 520, FIG. 5) associated with each functional unit. The power status indicator indicates whether the functional unit is in a powered-up or powered-down state. In another embodiment, the power supplied to a functional unit can be sensed, or the state of a power interface (e.g., interface 140, FIG. 1) can be determined.

If an identified PN-FU is currently in a low power state, then powering up of the functional unit is initiated, in block 206. In one embodiment, a signal is provided to the power interface (e.g., interfaces 140, FIG. 1) of the associated functional unit, which results in an increase in the level of power provided to the functional unit. In one embodiment, an indication is then made, in block 208, that the functional unit is in an operable power state. For example, the power status indicator (see element 520, FIG. 5) is modified to indicate that the functional unit is in an operable power state. In another embodiment, the power status indicator 520 (FIG. 5) is modified only after it is verified that the power level has reached the operable power state.

In one embodiment, the operable power level that is provided to a PN-FU has a pre-determined value. In another embodiment, the operable power level can be a selected operable power level chosen from one of multiple possible operable power levels with in a range of values. The selection of which operable power level to use can be based on the expected result latency (i.e., how much time is available before a result is needed). In other words, a determination is made, in one embodiment, of the expected result latency. This determination can be made, for example, by examining the contents of the cache and identifying which instruction (if any) will use the result, and approximately how much time will elapse before that instruction is executed. Based on the expected result latency, one of multiple operable power levels is selected. The selected operable power level is a power level which, in one embodiment, is the lowest operable power level that will enable the result to be available at the time that it is needed. In another embodiment, the selected operable power level is a power level that is higher.

In block 210, a determination is made whether any U-FUS identified in block 202 are currently in an operable power state. If not, the method ends. If so, then power-down of the operable power U-FUS is initiated, in block 212. As described previously, a functional unit is powered-down to a voltage approaching ground, in one embodiment, or to a higher standby voltage, in another embodiment.

In one embodiment, power-down is initiated only after any in-flight instructions, which use the operable power U-FUS, are completed. An "in-flight" instruction is an instruction that is currently being executed or is in line to be executed by the processor, and which has not yet completed. In one embodiment, an indication is made, in block 214, that the functional unit is in a low power state. For example, the power status indicator (see element 520, FIG. 5) is set to indicate that the functional unit is in a low power state. The method then ends.

FIG. 2 illustrates a relatively generic embodiment of the invention, where the identification of PN-FUS and U-FUS can be initiated upon the occurrence of any of a number of events. In a more specific embodiment, illustrated in FIG. 3, identifications of PN-FUS and U-FUS are initiated when instructions are fetched into the cache and eliminated from the cache, respectively.

Figure 3:
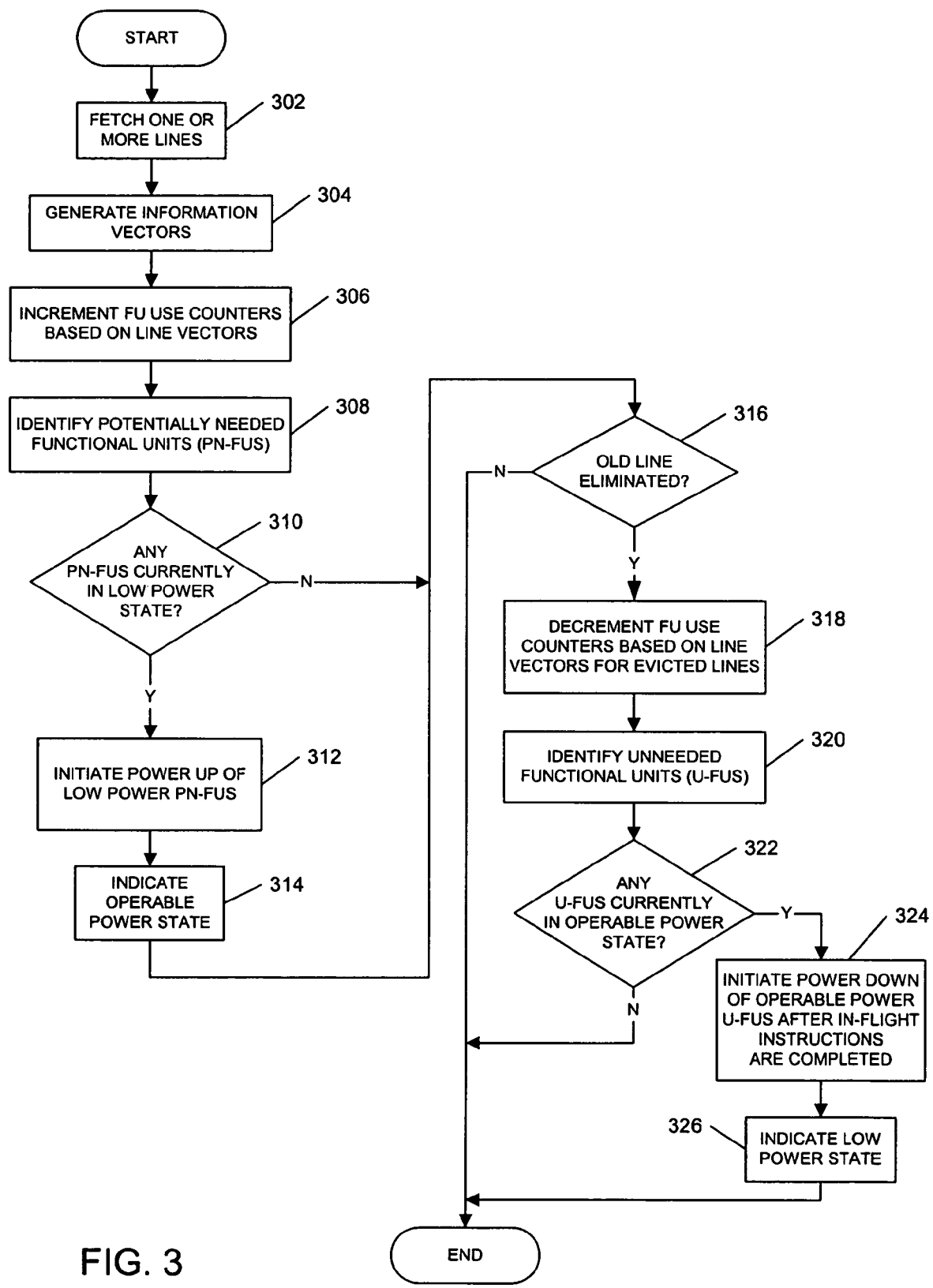
FIG. 3 is a flowchart of a procedure for selectively powering functional units, in accordance with another embodiment of the invention.

In particular, FIG. 3 is a flowchart of a procedure for selectively powering functional units, in accordance with another embodiment of the invention. Portions of the method can be performed by processing engine 112 (FIG. 1), predecoder 116, power controller 120, other processing elements (not shown), or combinations thereof.

The method begins, in block 302, when one or more instructions are fetched into the cache. In one embodiment, instructions are fetched as "lines" of instructions, where a single line includes multiple instructions. Each line is stored in a cache location. Before describing block 304 in detail, instruction cache 400 (FIG. 4) will be described.

Figure 4:
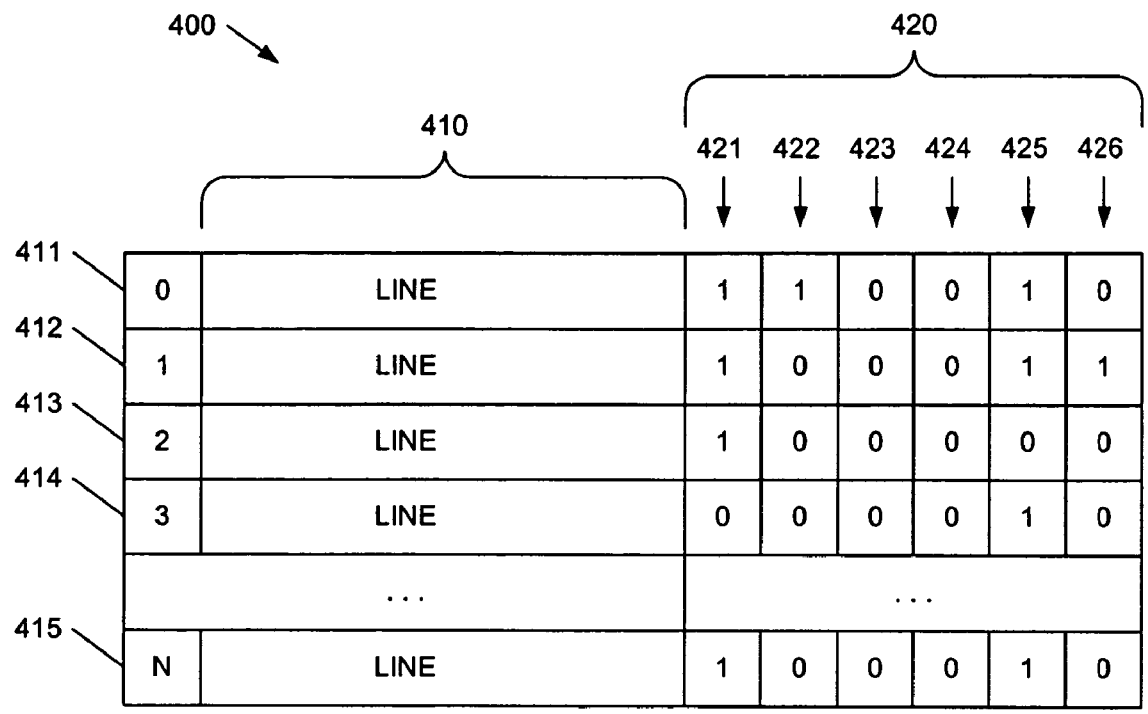
FIG. 4 is a first example of an instruction cache, in accordance with an embodiment of the invention.

FIG. 4 is a first example of an instruction cache 400, in accordance with an embodiment of the invention. Cache 400 includes multiple locations 411-415. Although the description and figures describe and illustrate caches of example sizes and having particular fields, the scope of the inventive subject matter includes caches of different (e.g., longer or shorter) sizes. In addition, in other embodiments, the cache can include more, fewer or different fields, and/or the fields can be differently arranged.

The relative address of each location 411-415 is identified with an integer 0-N for illustration purposes. Within each location 411-415, one or more instructions 410 can be stored. In one embodiment, a line including multiple instructions can be stored within each location 411-415. In another embodiment, a single instruction is stored within each location.

The cache 400 can be filled sequentially (e.g., starting at location 411 and proceeding toward location 415) or non-sequentially with fetched instructions. In one embodiment, cache 400 is a conventional cache, where the instructions associated with a particular line are in the same physical order that they occur in the software program. For example, a cache location (e.g., location 411) can include a line of instructions associated with physically contiguous program addresses, as illustrated in the example listing in Table 1 below, where the multiple assembly code instructions constitute a line:

TABLE 1

Example instruction line within a conventional cache.

| program address | instruction | |
|---|---|---|
| 4005100 | mov | r3, r12 |
| 4005104 | cmp | r12, #0x0 |
| 4005108 | beq | 0x4005114 |
| 400510c | cmp | r12, #0x1 |
| 4005110 | beq | 0x4005820 |

During actual execution of the line of instructions, a determination can be made, for example, that it is necessary to fetch and execute one or more instructions beginning at address 4005814. Accordingly, a line of instructions beginning at address 4005814 can be fetched and placed into another cache location. The cache location can be the next sequential location (e.g., location 412, FIG. 4) or the cache location can be elsewhere (e.g., location 414). Thus, in a conventional cache, although each cache location includes one or more physically contiguous instructions, the sequential ordering of instructions is not necessarily carried through from one cache location to the next.

In another embodiment, cache 400 is a trace cache. A trace cache differs from a conventional cache in that instructions are stored in a predicted order of the program flow, rather than in the sequential order of the program. Accordingly, a line within a trace cache is also referred to as a "trace," as the instructions within the line trace the program flow. For example, in a trace cache, a cache location (e.g., location 411) can include a line of instructions associated with program addresses that are not physically contiguous, as illustrated in the example listing in Table 2 below, where the multiple assembly code instructions constitute a line or trace:

TABLE 2

Example instruction line within a trace cache.

| program address | instruction | |
|---|---|---|
| 4005cec | mov | r3, r12 |
| 4005cf0 | cmp | r3, #0x0 |

TABLE 2-continued

Example instruction line within a trace cache.

| program address | instruction | |
|---|---|---|
| 4005cf4 | sub | r12, 412, #0x1 |
| 4005cf8 | beq | 0x4005d1c |
| 4005d1c | mov | r0, #0x0 |
| 4005d20 | ldmia | sp!, {r4, r6–r9, pc} |
| 4005800 | cmp | r0, #0x0 |
| 4005804 | beq | 0x4005814 |
| 4005814 | add | r10, r6, #0x1 |
| 4005818 | mov | r3, #0x1 |
| 400581c | str | r3, [r11, #-0x2c] |
| 4005820 | ldr | r1, [r5, #0x8] |

Referring back to FIG. 3, in block 304, an information vector is generated for each line of the cache. In one embodiment, an information vector is generated by a predecoder (e.g., predecoder 116, FIG. 1) as the line is brought into the cache. In other embodiments, an information vector is generated by another processing element. In still other embodiments, an information vector is generated at a time other than when the line is brought into the cache.

The information vector for each line indicates which functional units the line may need, if the instructions in the line are executed. The information vectors can be stored along with the cache lines or separately, in various embodiments.

Referring again to FIG. 4, an information vector 420 is shown to be associated with each cache line 411-415. In one embodiment, an information vector 420 includes a use indicator 421-426 for each of the functional units whose power can be controlled. In one embodiment, each use indicator is represented by a single bit, although multiple bits can be used for each use indicator in other embodiments. In the illustrated example, each use indicator 421-426 corresponds to a particular functional unit. For example, indicator 421 can correspond to a floating-point unit, indicator 422 can correspond to a multiplier, indicator 423 can correspond to an encryption unit, etc.

A high or "1" value indicates, in one embodiment, that the corresponding cache line may need the corresponding functional unit, if the line is executed. Conversely, a low or "0" value indicates, in one embodiment, that the corresponding cache line will not need the corresponding functional unit, if the line is executed. For example, the information vector 420 associated with cache line 411 indicates that the line, if executed, may need functional units associated with indicators 421, 422, and 425. The information vector 420 also indicates that line 411, if executed, will not need functional units associated with indicators 423, 424 or 426.

In another embodiment, the information vector 420 includes one or more attribute bits, referred to as an attribute indicator, describing functional unit(s) used by the associated line or trace. For example, but not by way of limitation, if a multiply instruction is not in the line, then a "power-off-multiply" attribute indicator is set in the information vector 420. Conversely, if a multiply instruction is in the line, then a "power-on-multiply" attribute indicator is set. In still other embodiments, additional or other attribute indicators can be included for some or all functional units. For example, but not by way of limitation, an attribute indicator can be used to indicate that the multiplier unit should be turned off, if the latter half of the line or trace will not use the multiplier unit. As another example, an attribute indicator can be used to indicate that the multiplier unit should be turned on with low voltage, as the associated instruction does not need a high-performance multiply operation.

In the illustrated embodiment, an information vector 420 is stored in the cache 400, in conjunction with each cache line 410. In other embodiments, the information vectors can be stored separately from the cache 400, and/or information vectors can be stored in conjunction with each instruction, rather than with each line.

Besides the information vectors, a functional unit status table is maintained, in one embodiment, to track the power level status for each functional unit. In one embodiment, the status table also tracks how many lines, within the cache, use any particular functional unit.

Referring back to FIG. 3, when one or more lines are brought into the cache, various functional unit use counters are incremented, in block 306, to reflect the number of cache lines that include instructions that may use each functional unit. In one embodiment, the functional unit use counters are updated based on the information contained within each line vector. Before continuing the description of FIG. 3, it will be useful to turn to FIG. 5.

Figure 5:
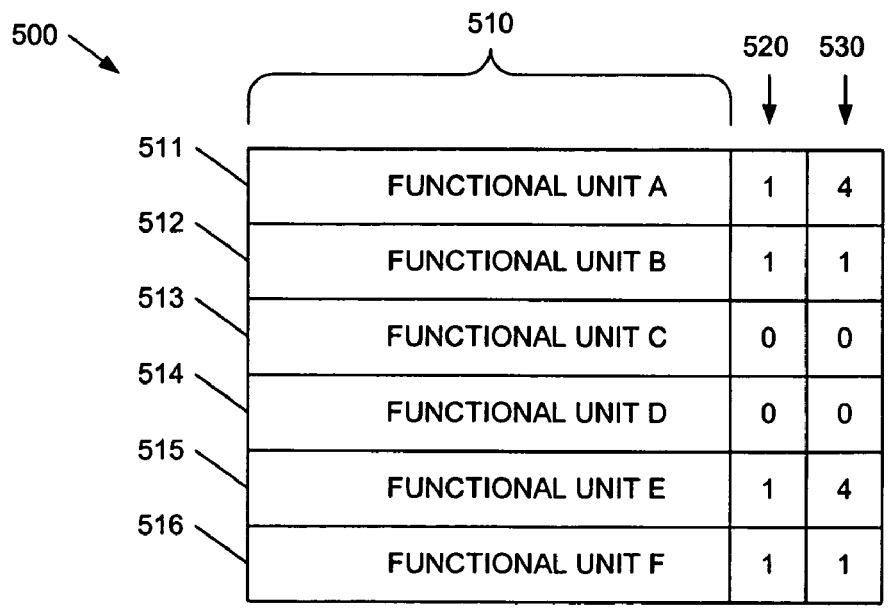
FIG. 5 is a first example of a functional unit status table, in accordance with an embodiment of the invention.

FIG. 5 is a first example of a functional unit status table 500, in accordance with an embodiment of the invention. In one embodiment, table 500 includes a record 511-516 for each functional unit whose power is selectively controllable using embodiments of the invention. A first field 510, within each record, identifies the functional unit. For example, FIG. 5 includes a record 511-516 for functional units "A-F."

A second field 520, within each record, includes a power status indicator. In one embodiment, the power status indicator includes one or more bits. The value in the indicator 520 indicates whether the associated functional unit is in an operable power or low power state. For example, a value of "1" indicates that the associated functional unit is in an operable power state, in one embodiment, and a value of "0" indicates that the associated functional unit is in a low power state.

A third field 530, within each record, includes a "use counter," which indicates how many lines, within the cache, include an instruction that may use the particular functional unit, if that instruction is executed. In one embodiment, each use counter 530 is represented by multiple bits. The number of bits is sufficient to represent an integer value that is as large as the size of the cache, in one embodiment. For example, but not by way of limitation, if a cache includes $2^{16}$ locations, then each use counter 530 is represented by at least 16 bits. In other embodiments, each use counter can include fewer bits.

Referring again to FIG. 3, each time one or more lines are brought into the cache, the functional unit use counters (e.g., counters 530, FIG. 5) are incremented, in block 306, based on the line vectors for the new lines. For example, assume that line 413 (FIG. 4) has just entered the cache. Based on the line vector 420 for line 413, it is apparent that an instruction within the line may use the functional unit associated with use indicator field 421. Thus, in block 306, the use counter 530 (FIG. 5) associated with that functional unit is incremented.

Assuming that use indicator field 421 corresponds to "functional unit A" (i.e., record 511, FIG. 5), and that use indicator field 422 corresponds to "functional unit B" (i.e., record 512), and so on, then each use counter 530 represents the sum total of lines, within the cache, that include instructions that may use each functional unit. For example, within the use indicator field 421 for each of the cache locations 411-415, the total number of values indicating that an instruction in the line may use the associated functional unit equals "4." Accordingly, the use counter 530 (FIG. 5) for functional unit A (i.e., record 511, FIG. 5) includes a value of "4."

Referring back to FIG. 3, in block 308, potentially needed functional units (PN-FUS) are identified. In one embodiment, PN-FUS are identified as functional units having use counters with values that are greater than zero.

A determination is made, in block 310, whether any identified PN-FUS are currently in a low power state. In one embodiment, this determination is made by evaluating the power status indicator (e.g., indicator 520, FIG. 5) and the use counter (e.g., use counter 530) for each functional unit. If a use counter has a non-zero value, but the associated power status indicator has a value indicating that the unit is in a low power state, then it is determined that the PN-FU is currently in a low power state. Conversely, if the power status indicator has a value indicating that the unit is in an operable power state, then it is determined that the PN-FU is not currently in a low power state. Accordingly, the unit is not powered-up.

In block 310, if it is determined that one or more PN-FUS are in a low power state, then in block 312, powering up of the low power PN-FUS is initiated. In one embodiment, signals are provided to the power interfaces (e.g., interfaces 140, FIG. 1) of the associated low power PN-FUS, which result in an increase in the level of power provided to the PN-FUS. In one embodiment, an indication is then made, in block 314, that the functional unit is in an operable power state. For example, the power status indicator 520 (FIG. 5) is modified to indicate that the functional unit is in an operable power state. In another embodiment, the power status indicator 520 (FIG. 5) is modified only after it is verified that the power level has reached the operable power state.

In block 316, a determination is made whether one or more old lines (e.g., lines that existed within the cache before the fetch operation) have been eliminated from the cache. In one embodiment, an old line may be eliminated if it is replaced with a new line, or if the old line is evicted, erased or issued. If no old line has been eliminated, then the method ends.

If one or more old lines have been eliminated, then in block 318, the information vector (e.g., vector 420, FIG. 4) for each eliminated line is evaluated to determine which functional units the instructions within the old line may have used, if executed. The functional unit use counters (e.g., counters 530, FIG. 5) associated with those functional units are then decremented.

In block 320, unneeded functional units (U-FUS) are identified. In one embodiment, U-FUS are identified as functional units having use counters with values that are zero or less.

A determination is made, in block 322, whether any identified U-FUS are currently in an operable power state. In one embodiment, this determination is made by evaluating the power status indicator (e.g., indicator 520, FIG. 5) and the use counter (e.g., use counter 530) for each functional unit. If a use counter has a zero or below-zero value, but the associated power status indicator has a value indicating that the unit is in an operable power state, then it is determined that the U-FU is currently in an operable power state. Conversely, if the power status indicator has a value indicating that the unit is in a low power state, then it is determined that the U-FU is not currently in an operable power state. Accordingly, the unit is not powered-down.

In block 322, if it is determined that one or more U-FUS are in an operable power state, then in block 324, powering down of the operable power U-FUS is initiated. As described previously, a functional unit is powered-down to a voltage approaching ground, in one embodiment, or to a higher standby voltage, in another embodiment. In one embodiment, power-down is initiated only after any in-flight instructions, which use the operable power U-FUS, are completed.

In one embodiment, to initiate power-down, signals are provided to the power interfaces (e.g., interfaces 140, FIG. 1) of the associated operable power U-FUS, which result in a decrease in the level of power provided to the U-FUS. In one embodiment, an indication is then made, in block 326, that the functional unit is in a low power state. For example, the power status indicator 520 (FIG. 5) is modified to indicate that the functional unit is in a low power state. In another embodiment, the power status indicator 520 (FIG. 5) is modified only after it is verified that the power level has reached the low power state. The method then ends.

An example of how the information vectors (e.g., vectors 420, FIG. 4), power status indicators (e.g., indicators 520, FIG. 5), and use counters (e.g., counters 530) are manipulated when lines are brought into and eliminated from the cache will now be given. Reference is made to FIGS. 4-7 to illustrate the example.

Assume FIGS. 4 and 5 represent the state of the cache 400 and functional unit status table 500 at a given time. Assume also that use indicator field 421 within vector 420 represents functional unit A, use indicator field 422 represents functional unit B, and so on. In evaluating use indicator field 421 for each of the cache locations 411-415, and assuming these locations are the only filled locations in the cache, it is apparent that a total of four cache lines include instructions that may use functional unit A, if those instructions are executed. Accordingly, in record 511, which corresponds to functional unit A, the use counter 530 includes a value of "4." In addition, the power status indicator 520 includes a value of "1," which in one embodiment indicates that functional unit A is in an operable power state (i.e., it is receiving a level of power that is sufficient for it to execute instructions).

Field 424 represents functional unit D. In evaluating use indicator field 424 for each of the cache locations 411-415, under the same assumptions, it is apparent that a total of zero cache lines include instructions that may use functional unit D, if those instructions are executed. Accordingly, in record 514, which corresponds to functional unit D, the use counter 530 includes a value of "0," and the power status indicator 520 includes a value of "0," which in one embodiment indicates that functional unit D is in a low power state (i.e., it is not receiving a level of power that is sufficient for it to execute instructions).

Assume now that line 412 of the cache will now be replaced with another fetched line. The line vector for the "old line" indicates that the instructions in the old line may have used functional units A, E, and F, as indicated by use indicator fields 421, 425, and 426, respectively.

Reference is now made to FIGS. 6 and 7, which are second examples of the instruction cache of FIG. 4 and the functional unit status table of FIG. 5, respectively, in accordance with an embodiment of the invention. As line 412 (FIG. 4) is replaced to become line 612 (FIG. 6), the information vector 420 associated with line 412 is updated to reflect the new line coming in, as indicated by information vector 620 (FIG. 6). In the given example, the line vector 620 for the "new line" indicates that the instructions in the new line may use functional units A, B, and D, as indicated by use indicator fields 621, 622, and 624, respectively.

According to an embodiment illustrated in FIG. 3, and the example given above, the functional unit use counters 530, 730 (FIGS. 5, 7) are incremented and decremented as follows. Based on the line vector 620 (FIG. 6) for line 612, the use counters 530, 730 (FIGS. 5, 7) associated with functional units A, B, and D are incremented (block 306, FIG. 3). For functional unit D, in particular, this means that the use counter value changes from "0" (see 530, FIG. 5) to a value of "1" (see 730, FIG. 7). Accordingly, this indicates that power-up of functional unit D should now be initiated (block 312, FIG. 3), and the power status indicator 520, 720 (FIGS. 5, 7) for functional unit D should be updated (block 314, FIG. 3) to indicate that functional unit D is now in an operable power state, as is represented in FIG. 7. In addition, the use counters 530, 730 for functional units A and B are also incremented (block 306, FIG. 3). However, these increments do not result in a power state change.

The use counters 530, 730 are also decremented based on the information vector for the eliminated line 412 (FIG. 4). Based on the line vector 420 for the old line, illustrated in FIG. 4, the use counters 530, 730 (FIGS. 5, 7) associated with functional units A, E, and F are decremented (block 318, FIG. 3). For functional unit F, in particular, this means that the use counter value of "1" (see 530, FIG. 5) changes to a value of "0" (see 730, FIG. 7). Accordingly, this indicates that power-down of functional unit F should now be initiated (block 324, FIG. 3), and the power status indicator 520, 720 (FIGS. 5, 7) for functional unit F should be updated (block 326, FIG. 3) to indicate that functional unit F is now in a low power state, as is represented in FIG. 7. In addition, the use counters for functional units A and E are also decremented (block 318, FIG. 3). However, these decrements do not result in a power state change.

In previous embodiments, use counters (e.g., counters 530, FIG. 5) are used to determine whether any lines, within the cache, include instructions that may need particular functional units, if those instructions are executed. In other embodiments, this determination is made differently.

For example, in an alternate embodiment, for a particular functional unit, the use indicators (e.g., indicators 421-426, FIG. 4) within the information vectors (e.g., vectors 420) are evaluated, when desired, to determine whether any lines include instructions that may need the particular functional unit to execute. In one embodiment, the use indicators for a particular functional unit are "ORed" together to determine if one or more indicators indicate that an instruction within any line may need the functional unit.

For example, referring to FIG. 4, when all indicators within use indicator column 421 are "ORed" together, this indicates that functional unit A may be needed by at least one instruction in the cache 400. Conversely, when all indicators within column 423 are "ORed" together, this indicates that functional unit C will not be needed by any instruction within the cache 400. In one embodiment, the "OR" logic is performed substantially in software or firmware. In another embodiment, the "OR" logic is performed substantially in hardware.

Figure 8:
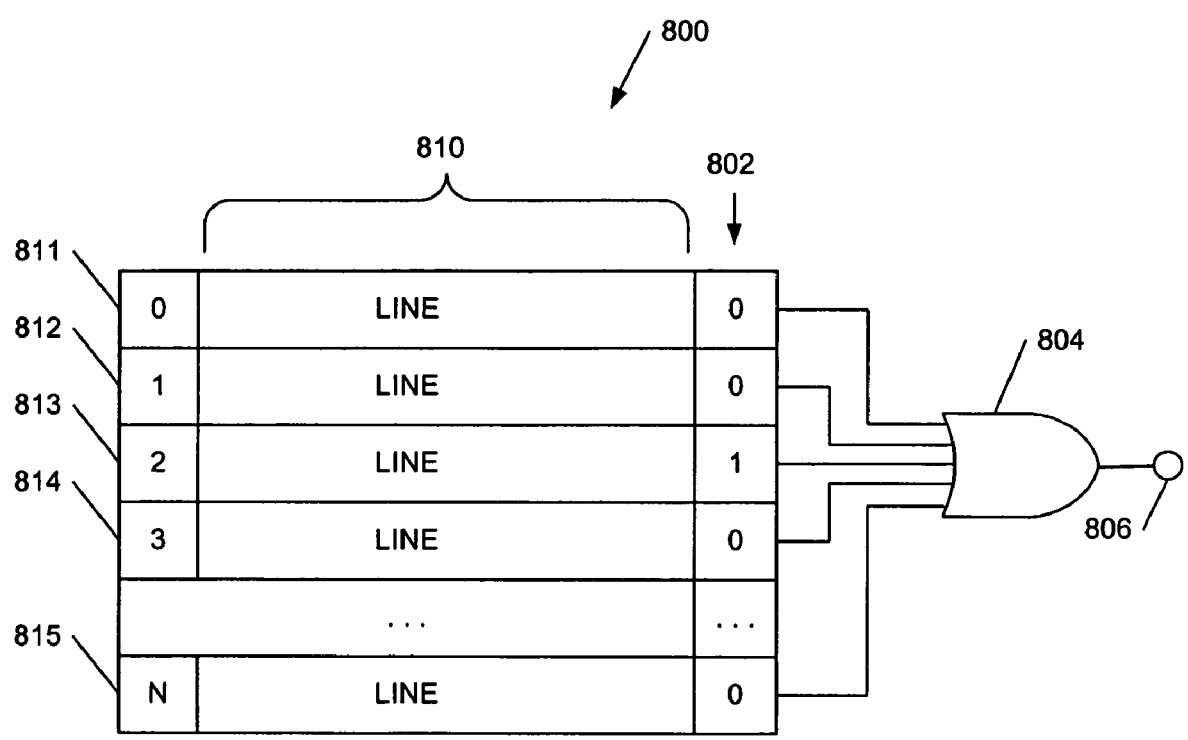
FIG. 8 is an example of an instruction cache, in accordance with another embodiment of the invention.

FIG. 8 is an example of an instruction cache 800, in accordance with another embodiment of the invention. Cache 800 includes multiple cache locations 811, 812, 813, 814, 815, each of which is configured to store a line 810 of instructions. Associated with each line is an information vector, which includes a use indicator field (e.g., field 802) for each of at least one functional unit. For ease of illustration, only one use indicator field 802 is illustrated in FIG. 8. More fields can be included in the information vector, as was illustrated in FIG. 4.

In one embodiment, logic element 804 receives the state of the use indicator field 802 for each line within the cache 800. Logic element 804 substantially includes "OR" logic, in one embodiment, which produces a high value at output 806 when one or more of the use indicator fields 802 have a high value. Logic element 804 produces a low value at output 806 when none of the use indicator fields 802 have a high value. Accordingly, the value at output 806 indicates whether any instruction within the cache 800 may need the functional unit associated with field 802, if the instruction is executed. In the present example, the value at output 806 is a high value, because the use indicator 802 associated with cache location 813 has a high value. If multiple use indicator fields are present within an information vector, then similar logic is associated with each use indicator field, in one embodiment.

In embodiments described above, a line vector (e.g., vector 420, FIG. 4) is associated with the lines (e.g., lines 410) stored within the cache. The line vectors are stored as part of the cache, in one embodiment, and separately from the cache, in another embodiment.

In another embodiment, line vectors are not stored. Instead, at various times, the functional unit usage for each line in the cache is determined on an as needed basis. For example, the functional unit usage is determined, in one embodiment, when a line is fetched into the cache and when the line is eliminated from the cache. This information is used to update the use counters (e.g., counters 530, FIG. 5) or other usage indicators, and then the information is discarded. In such an embodiment, functional unit usage information may be determined multiple times for a single line (e.g., once when the line is fetched, once when the line is eliminated, and possibly at other times).

Embodiments of the invention, described above, base decisions on whether and when to power-up and/or power-down functional units on the entire contents of the cache. In other words, if a single instruction within a single line of the cache may use a functional unit, then that functional unit is powered-up, regardless of whether the line is ever activated or the instruction is ever actually executed.

In various alternate embodiments, the decisions on whether and when to power-up and/or power-down functional units are based on less then the entire contents of the cache. In particular, the decisions are based on the contents of at least one, but fewer than all of the lines in the cache.

Figure 9:
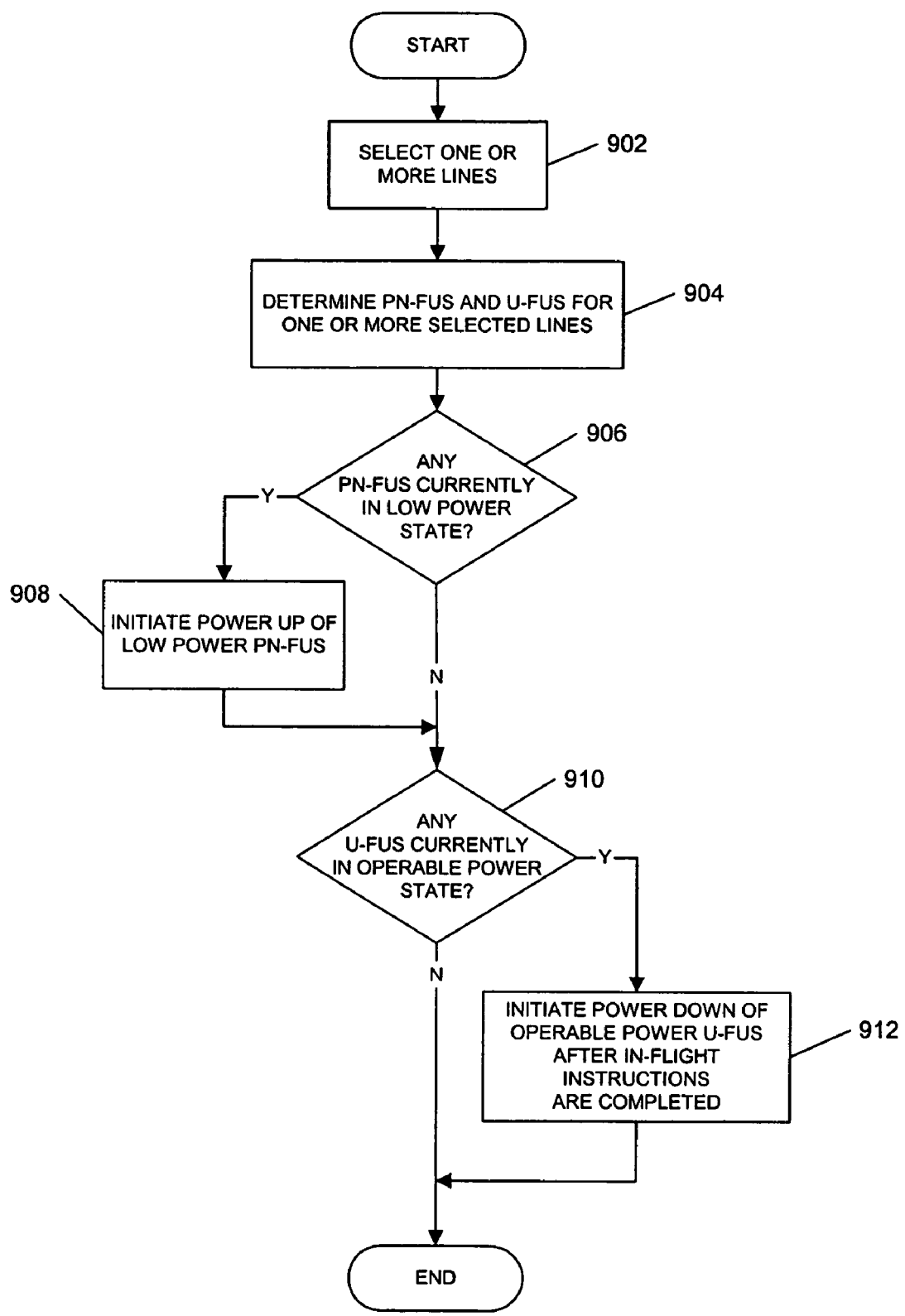
FIG. 9 is a flowchart of a procedure for selectively powering functional units, in accordance with still another embodiment of the invention.

FIG. 9 is a flowchart of a procedure for selectively powering functional units, in accordance with still another embodiment of the invention. The method begins, in block 902, by selecting one or more lines, referred to herein as "selected lines," within the cache. In one embodiment, the selected lines include fewer than all of the lines in the cache, including as few as one line.

In block 904, determinations are made of potentially needed functional units (PN-FUS) and unneeded functional units (U-FUS) for the one or more selected lines. In one embodiment, this determination is made for a single line when the line is activated, which indicates that the processor is beginning to access or issue the instructions within the line. In one embodiment, the instructions within the activated line are scanned, to determine which functional units may be used by one or more instructions. These functional units are identified as PN-FUS, and the functional units that will not be used by any instruction in the line are identified as U-FUS. In another embodiment, the determination of PN-FUS and U-FUS can be made for a subset of lines that includes more than one, but fewer than all of the lines in the cache.

In block 906, a determination is made whether any PN-FUS identified in block 904 are currently in a low power state. As described previously, this determination can be made by evaluating a power status indicator (e.g., indicator 520, FIG. 5) for the identified PN-FUS. Alternatively, the power level can be sensed or otherwise determined.

If any identified PN-FUS are currently in a low power state, then in block 908, power-up of those PN-FUS is initiated. As described previously, initiating power-up can be performed by sending a signal to a power interface (e.g., interface 140, FIG. 1) for the associated functional unit.

A determination is also made, in block 910, whether any U-FUS identified in block 904 are currently in an operable power state. As described previously, this determination can be made by evaluating a power status indicator (e.g., indicator 520, FIG. 5) for the identified U-FUS. Alternatively, the power level can be sensed or otherwise determined.

If any identified U-FUS are currently in an operable power state, then in block 912, power-down of those U-FUS is initiated. In one embodiment, power-down is initiated only after in-flight instructions that use the identified U-FUS have completed. As described previously, initiating power-down can be performed by sending a signal to a power interface (e.g., interface 140, FIG. 1) for the associated functional unit. The method then ends.

Embodiments described and illustrated in conjunction with FIG. 9 can be implemented with a conventional cache, a trace cache, or another type of cache. Embodiments described in conjunction with FIG. 9 are particularly useful in conjunction with a trace cache, for several reasons. First, as described above, a line within a trace cache includes instructions that follow the expected program flow of the software, rather than the physical order of the software, as is the case with a conventional cache. Accordingly, it is less likely that the processor will jump from line to line within a trace cache. A second reason is that lines within a trace cache are typically longer than lines within a conventional cache. Accordingly, it is more likely that a processor will stay within a particular line of a trace cache longer than it will stay within a particular line of a conventional cache. For these reasons, determinations of which functional units the instructions within a trace cache line will use are more likely to predict what will actually happen when the line is executed. In addition, because it is less likely that the processor will abruptly and frequently jump into other lines, the risk that a functional unit will not be powered in sufficient time to execute an instruction in another line is reduced.

In one embodiment, a trace cache is implemented, in which the logic implemented by the decoder (e.g., predecoder 116, FIG. 1) is at least partially replaced using a series of shift registers. The shift registers are clocked to provide access to the data in the cache in sequence, as will be described further below.

Figure 10:
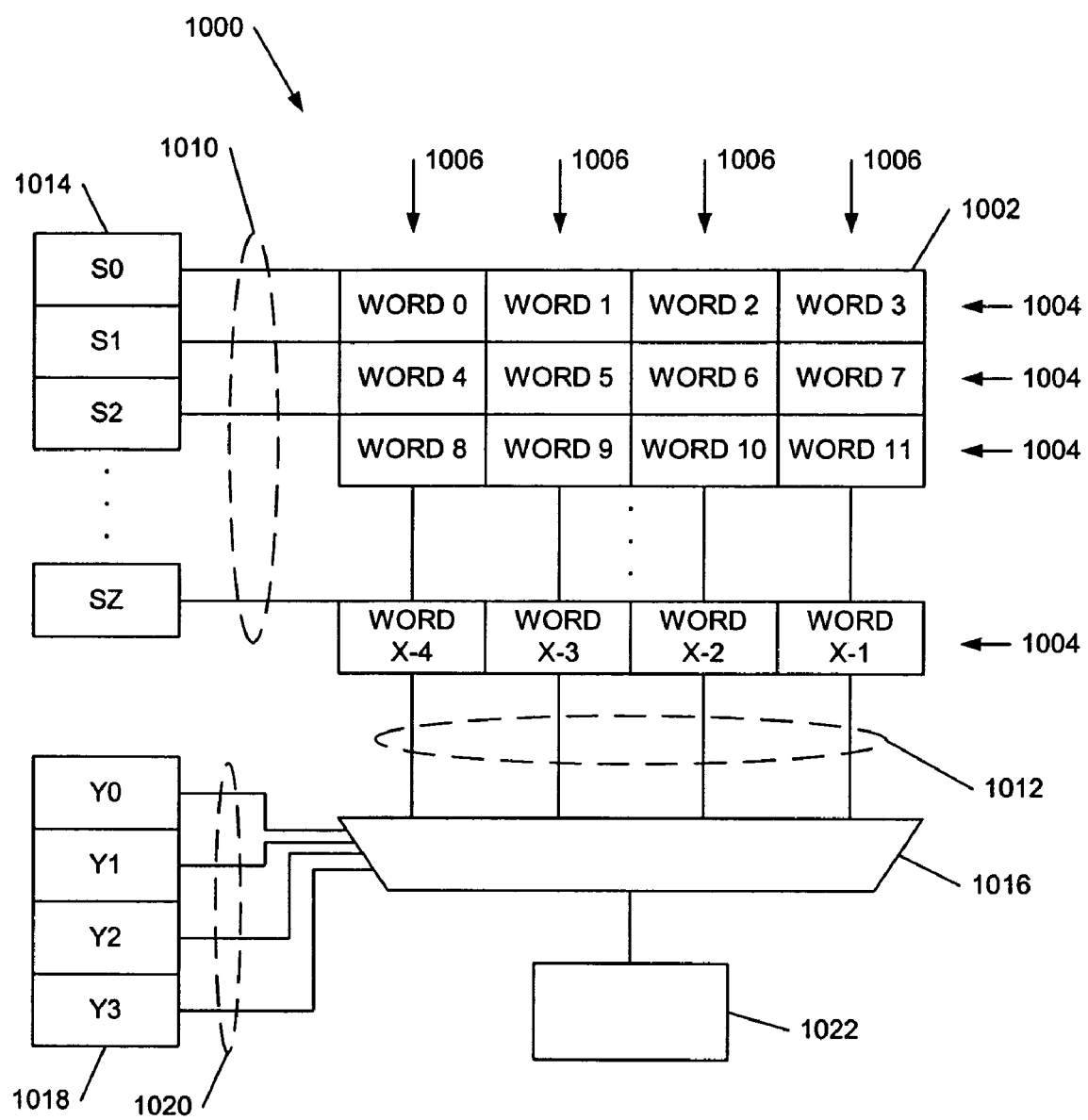
FIG. 10 is a simplified diagram of a cache, in accordance with an embodiment of the invention.

FIG. 10 is a simplified diagram of a cache 1000, in accordance with another embodiment of the invention. Cache 1000 includes a two-dimensional array of storage locations 1002, a plurality of word lines 1010, a plurality of bit lines 1012, word select latches 1014, multiplexer 1016, multiplexer control latches 1018, multiplexer control lines 1020, and sense amplifiers 1022, in one embodiment.

Storage 1002 stores instruction words in rows 1004 and columns 1006. For example purposes only, each row 1004 within storage 1002 is shown to include four words. More or fewer words can be included in each row.

Each instruction word is accessible by selecting a particular row 1004 and column 1006. A particular row 1004 is selected when the corresponding word line 1010 is activated. Word lines 1010 are activated one at a time, in a mutually exclusive manner. The activation value for each word line 1010 is held in a plurality of word line select latches 1014. When a row 1004 is selected, the data within the row 1004 becomes available to multiplexer 1016 via bit lines 1012.

A particular column 1006 is selected by enabling one bit line path through multiplexer 1016, which is also referred to as a "y-mux." Column selection is accomplished by activating one of the multiplexer control lines 1020 based on values within a plurality of multiplexer control latches 1018. The multiplexer control lines 1020 also are activated one at a time, in a mutually exclusive manner. When a particular row 1004 and column 1006 are activated, the result is that a single word is selected and made available at the output of multiplexer 1016. This word is then provided, via sense amplifiers 1022, to a consumer of the data.

The values in the word line select latches 1014 and the multiplexer control latches 1018 are initially set by decoding an address. In one embodiment, N address bits go through a 1-of-$2^N$ decoder to create the values within word line select latches 1014. M address bits go through a 1-of-$2^M$ decoder to create the values within the multiplexer control latches 1018.

In one embodiment, at least some of the subsequent addresses do not use the decoders mentioned above. Instead, the values in the word line select latches 1014 and the values in the multiplexer control latches 1018 are shifted in such a manner to access contiguous words stored within storage 1002. An "enable signal" is a signal that includes the combined values of the word line select latches 1014 and the multiplexer control latches 1018. A first portion of the enable signal is stored in the word line select latches 1014, and a second portion of the enable signal is stored in the multiplexer control latches 1018. The first portion of the enable signal is used to activate a selected word line, and the second portion of the enable signal is used to select a portion of the selected word line.

Assuming, for simplicity sake, that the word line select latches 1014 include only the first three cells (i.e., S0, S1, and S2), an enable signal in accordance with the illustrated example is a seven-bit signal that includes: S0, S1, S2, Y0, Y1, Y2, Y3. For example, but not by way of limitation, to sequentially access WORD 4 through WORD 9 in storage 1002, the word line select latches 1014 and the multiplexer control latches 1018 can assume the values shown in Table 3, below, where "S0, S1, S2" indicate the values in the first three word line select latches 1014, and "Y0, Y1, Y2, Y3" indicate the values in the four multiplexer control latches 1018:

TABLE 3

Word line select latch values and multiplexer control values.

| | Enable Bit | | | | | | |
|---|---|---|---|---|---|---|---|
| Word | S0 | S1 | S2 | Y0 | Y1 | Y2 | Y3 |
| 4 | 0 | 1 | 0 | 1 | 0 | 0 | 0 |
| 5 | 0 | 1 | 0 | 0 | 1 | 0 | 0 |
| 6 | 0 | 1 | 0 | 0 | 0 | 1 | 0 |
| 7 | 0 | 1 | 0 | 0 | 0 | 0 | 1 |
| 8 | 0 | 0 | 1 | 1 | 0 | 0 | 0 |
| 9 | 0 | 0 | 1 | 0 | 1 | 0 | 0 |

One skilled in the art will recognize, based on the description herein, that the above sequence of enable signals can be generated with shifting logic on word line select latches 1014 and multiplexer control latches 1018. As Table 3 illustrates, the values within multiplexer control latches 1018 are shifted more often than the values within word line select latches 1014 by a factor equal to the number of words within a row.

Word line select latches 1014 and multiplexer control latches 1018 basically function as shift registers, which form at least a portion of a mechanism to sequentially access the storage locations within the array 1002 using the enable signal. In other words, the enable signal has a value that results from shifting information within one or more shift registers.

In one embodiment, the shifting logic is a simple shift register with a single "1" bit stored within it. In another embodiment, a twisted-ring shift register with decoding via 2-input AND gates can be used. Other embodiments would be obvious to those of skill in the art, based on the description herein.

The cache's power consumption, using the addressing methods of the above embodiments, is less than the power consumption for a conventional cache, because the address decoders of a conventional cache are replaced with simple shift-register logic in the embodiments described above. Implementation of the above embodiments is appropriate for an instruction cache, because instruction addresses often display sequential behavior. This is particularly true for a trace cache.

The cache of FIG. 10 has advantages over prior-art caches in that the cache of FIG. 10 can be less power consumptive than a cache that includes a full word line decoder. Through the use of shifting logic to shift the values sequentially through the cells of word line select latches 1014 and multiplexer control latches 1018, storage locations are sequentially accessed using the enable signal.

In various embodiments described in conjunction with FIGS. 2 and 3, determinations of whether to power-up or power-down a functional unit are based on the contents of the entire cache (e.g., when a new line enters or is evicted from the cache). In various embodiments described in conjunction with FIGS. 9 and 10, these determinations are based on the contents of less than the entire cache (e.g., fewer than all lines). In an alternate embodiment, a combination of these techniques is used. More specifically, power-up determinations for some functional units are made based on the entire contents of the cache, and power-up determinations for other functional units are made based on less than the entire contents of the cache. For example, for functional units that take a relatively long time to power-up, the power-up determinations are made based on the entire contents of the cache (e.g., when a new line enters the cache). For functional units that take a relatively short time to power-up, the power-up determinations are made based on the line being activated or issued, or entering a shift register. In still another alternate embodiment, the power-up determinations are made based on the line being activated or issued, and one or more lines that are anticipated to be activated or issued within a relatively short period of time.

Embodiments of the invention are implemented in an electronic system. The electronic system can be a portable or stationary system. For example, but not by way of limitation, embodiments of the invention can be implemented in portable communication devices (e.g., cellular telephones, radios, pagers, satellites, etc.), portable computing devices (e.g., laptop computers, calculators, personal data assistants, etc.), other portable electronic devices (e.g., televisions, cameras, video recorders, remote controllers, vehicles, electronic games and toys, etc.), as well as analogous stationary versions of the portable communication devices, computing devices, and other electronic devices described above. It is to be understood that embodiments of the invention can be implemented in other types of electronic systems, as well.

In various embodiments, the electronic system can receive power substantially from a battery source, from a continuous power source (e.g., an electrical connection to an outlet) or both. For illustration purposes, a battery-powered, wireless communication device is described below and illustrated in FIG. 11. It is to be understood that embodiments of the invention are not meant to be limited to battery-powered, wireless communication devices or to battery-powered devices. Instead, embodiments of the invention can be implemented in devices other than wireless communication devices and/or devices that receive power from a continuous power source.

Figure 11:
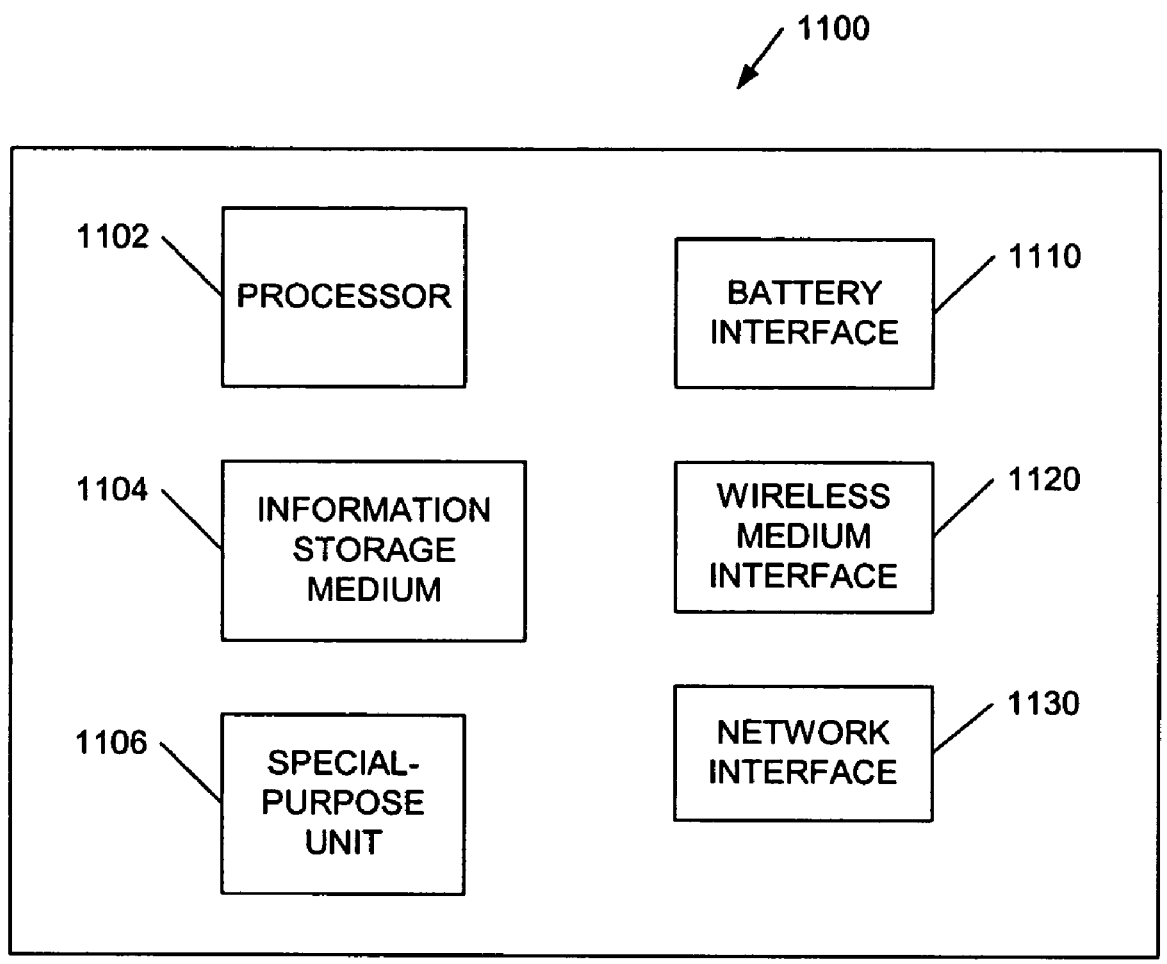
FIG. 11 is a simplified block diagram of an electronic system, in accordance with an embodiment of the invention.

FIG. 11 is a simplified block diagram of an electronic system 1100, in accordance with an embodiment of the invention. System 1100 includes one or more processors 1102 and one or more information storage medium 1104. An information storage medium 1104 can include, for example, random access memory (RAM), read only memory (ROM), hard disk, and/or one or more interfaces for removable information storage (e.g., floppy disk drive, CD ROM drive).

Processor 1102 includes a processing engine (e.g., engine 112, FIG. 1), a cache (e.g., cache 114, FIG. 1), in one embodiment. In various embodiments, processor 1102 evaluates the contents of a cache (e.g., cache 114, FIG. 1), and makes determinations of whether to power-up or power-down various internal and/or external functional units based on those contents. Accordingly, in one embodiment, processor 1102 may also include one or more internal functional units (e.g., units 118, FIG. 1), to which power can be selectively controlled, in accordance with various embodiments.

In one embodiment, system also includes one or more special-purpose units 1106, which can be, for example but not by way of limitation, co-processors, special processing units (e.g., digital signal processors, special media processors, special-purpose accelerators, encryption engines, key generation processors, etc.), and other types of units. Each of the special-purpose units 1106 may include one or more external functional units (e.g., units 130, FIG. 1), to which power can be selectively controlled, in accordance with various embodiments.

In one embodiment, system 1100 further includes a battery interface 1110. Battery interface 1110 includes a receiving apparatus (not shown) with positive and negative contacts. In addition, battery interface 1110 may include a voltage adaptor and/or regulator. In another embodiment, system 1100 also or alternatively includes a continuous power source interface (not shown), which may include a power source connector (e.g., a plug and cord), and a voltage adaptor and/or regulator.

In still another embodiment, system 1100 further includes one or more wireless medium interfaces 1120, which enable signals to be sent to and/or received over a wireless medium (e.g., over the air, through water, etc.). For example, but not by way of limitation, a wireless medium interface 1120 can include a cellular antenna, a dipole antenna, a wireless network interface, an optical signal interface, a Bluetooth or other radio frequency interface, and or any of a number of other types of interfaces that enable communications over a wireless medium.

In still another embodiment, system 1100 includes one or more network interfaces 1130. A network interface 1130 enables signals to be sent to and/or received from a network, such as a local area network, a wide area network, the Internet, a remote database or computer, and/or any of a number of other devices that are distinct from system 1100. System 1100 can also include other components not illustrated in FIG. 11, such as other application specific integrated circuits (ASICs) and various user interfaces (e.g., keyboard, pointing device, speaker, microphone, display, etc.).

Thus, various embodiments of methods, apparatus, and systems have been described, in which one or more functional units are selectively powered-up or powered-down based on instructions contained within a cache or other instruction storage area. The foregoing description of specific embodiments reveals the general nature of the inventive subject matter sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Accordingly, embodiments of the invention embrace all such alternatives, modifications, equivalents, and variations as fall within the spirit and broad scope of the appended claims.

The various procedures described herein can be implemented in hardware, firmware, and/or software. A software implementation can use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, flash memory cards, digital video disks, Bernoulli cartridges, RAMs, ROMs, and the like.

What is claimed is:

1. A method comprising:

initiating a power increase for a potentially needed functional unit to an operable power level, if the potentially needed functional unit has a present power level that is lower than the operable power level when a use counter corresponding to the potentially needed functional unit contains a value other than a predetermined value;

fetching a line of one or more software instructions into an instruction cache;

generating an information vector for the line before or as the line is fetched into the instruction cache, wherein the information vector identifies a set of functional units that are operable to execute the one or more software instructions;

identifying the potentially needed functional unit based on the information vector;

adjusting the use counter for a corresponding functional unit when the functional unit is either identified as potentially needed or when a software instruction, having a corresponding information vector identifying the corresponding functional unit as potentially needed, is eliminated from the instruction cache.

2. The method of claim 1, further comprising:

fetching one or more software instructions into the instruction cache.

3. The method of claim 2, wherein fetching the one or more instructions comprises fetching the one or more instructions into a conventional cache.

4. The method of claim 2, wherein fetching the one or more instructions comprises fetching the one or more instructions into a trace cache.

5. The method of claim 1, further comprising:

indicating power status information for a set of functional units, wherein the power status information indicates whether a functional unit, within the set of functional units, has a present power level that places the functional unit in an operable power state or a low power state.

6. The method of claim 1, further comprising:

incrementing the use counter for a functional unit when a software instruction is fetched into the instruction cache, and when the functional unit should be operable to execute at least part of the software instruction.

7. The method of claim 6, further comprising:

decrementing the use counter for the functional unit when the software instruction is eliminated from the instruction cache.

8. The method of claim 1, further comprising:

selecting one or more selected lines of software instructions stored within the cache; and identifying the potentially needed functional unit as a functional unit that should be operable to execute at least one software instruction stored within the one or more selected lines.

9. The method of claim 1, further comprising:
activating a line of software instructions stored within the cache; and
identifying the potentially needed functional unit as a functional unit that is operable to execute at least one software instruction stored within the line.

10. The method of claim 1, further comprising:
identifying an unneeded functional unit as a functional unit that is not operable to execute the at least one software instruction; and
initiating a power decrease for the unneeded functional unit, if the unneeded functional unit has a second present power level that is greater than or equal to a second operable power level.

11. The method of claim 1, wherein initiating the power decrease comprises:
initiating the power decrease for the unneeded functional unit after execution is complete of any in-flight instructions that use the unneeded functional unit.

12. The method of claim 1, wherein initiating the power increase comprises:
initiating the power increase for a functional unit selected from a group of functional units that includes one or more floating-point units, multipliers, dividers, shifters, digital signal processors, co-processors, application specific integrated circuits, data processing engines, debug logic blocks, encryption units and key-generation units.

13. The method of claim 1, wherein initiating the power increase comprises:
determining a selected operable power level from one of multiple operable power levels, wherein the selected operable power level is selected based on an expected result latency; and
initiating the power increase to the selected operable power level.

14. A method comprising:
fetching one or more lines of software instructions into an instruction cache, which is accessible to a processing engine;
generating and storing an information vector for selected ones of the one or more lines before or as the one or more lines are fetched into the instruction cache, wherein the information vector identifies a set of functional units that should be operable to execute software instructions within a line;
identifying potentially needed functional units based on the information vector,
wherein a functional unit includes a portion of hardware, which is operable to perform a function in response to special instructions received from the processing engine;
adjusting a use counter corresponding to an identified potentially needed functional unit;
identifying unneeded functional units, based on use counters that contain a predetermined value, as functional units that are not required to be operable to execute a software instruction stored within the instruction cache;
initiating a power increase for selected ones of the potentially needed functional units that are in a low power state; and
initiating a power decrease for selected ones of the unneeded functional units that are in an operable power state.

15. The method of claim 14, wherein fetching the one or more instructions comprises fetching the one or more instructions into a conventional cache.

16. The method of claim 14, wherein fetching the one or more instructions comprises fetching the one or more instructions into a trace cache.

17. The method of claim 14, wherein initiating the power increase comprises:
initiating the power increase for a functional unit selected from a group of functional units that includes one or more floating-point units, multipliers, dividers, shifters, digital signal processors, co-processors, application specific integrated circuits, data processing engines, debug logic blocks, encryption units and key-generation units.

18. The method of claim 14, wherein initiating the power increase comprises:
determining a selected operable power level from one of multiple operable power levels, wherein the selected operable power level is selected based on an expected result latency; and
initiating the power increase to the selected operable power level.

19. A computer-readable medium having program instructions stored thereon to perform a method, which when executed within an electronic system, results in:
identifying a potentially needed functional unit as a functional unit that should be operable to execute at least one software instruction stored within an instruction cache;
fetching a line of one or more software instructions into the instruction cache;
generating and storing an information vector for the line before or as the line is fetched into the instruction cache, wherein the information vector identifies a set of functional units that should be operable to execute the one or more software instructions and wherein identifying the potentially needed functional unit is performed based on the information vector;
adjusting a use counter corresponding to a functional unit when the functional unit is identified as potentially needed; and
initiating a power increase for the functional unit if the use counter for the functional unit contains a value not equal to a predetermined value and if the potentially needed functional unit has a present power level that is lower than an operable power level.

20. The computer-readable medium of claim 19, wherein executing the program instructions further results in:
selecting one or more selected lines of software instructions stored within the cache; and
wherein identifying the potentially needed functional unit includes identifying the potentially needed functional unit as a functional unit that should be operable to execute at least one software instruction stored within the one or more selected lines.

21. The computer-readable medium of claim 19, wherein executing the program instructions further results in:
identifying an unneeded functional unit as a functional unit that is not required to be operable to execute the at least one software instruction; and
initiating a power decrease for the unneeded functional unit, if the unneeded functional unit has a second present power level that is greater than or equal to a second operable power level.

22. The computer-readable medium of claim 19, wherein initiating the power increase comprises:
  initiating the power increase for a functional unit selected from a group of functional units that includes one or more floating-point units, multipliers, dividers, shifters, digital signal processors, co-processors, application specific integrated circuits, data processing engines, debug logic blocks, encryption units and key-generation units.

23. An apparatus comprising:
  one or more functional units;
  an instruction cache;
  a processing engine, which is operable to access software instructions stored within the instruction cache, and send one or more special instructions to the one or more functional units in order to execute at least some of the software instructions;
  a predecoder that is configured to evaluate selected ones of the software instructions, before or as line is fetched into the instruction cache, to determine which functional units will be needed to execute an instruction, and to adjust a use counter corresponding to each functional unit that will be needed to execute an instruction; and
  one or more power controllers, which are operable to control whether or not an operable power level or a low power level is provided to selected ones of the one or more functional units, based on whether or not the use counters of selected ones of the one or more functional units contain values not equal to predetermined values.

24. The apparatus of claim 23, wherein at least one of the one or more functional units includes an internal functional unit, which is located on a same chip as the processing engine.

25. The apparatus of claim 23, wherein at least one of the one or more functional units includes an external functional unit, which is not located on a same chip as the processing engine.

26. The apparatus of claim 23, wherein the instruction cache includes a conventional cache.

27. The apparatus of claim 23, wherein the instruction cache includes a trace cache.

28. The apparatus of claim 23, wherein the instruction cache comprises:
  an array of storage locations; and
  a mechanism to sequentially access the storage locations within the array using an enable signal, which has a value that results from shifting information within one or more shift registers.

29. The apparatus of claim 28, wherein the mechanism to sequentially access the storage locations includes a plurality of first latches, within which a first portion of the enable signal is stored, and wherein the first portion of the enable signal is used to activate a selected word line within the array.

30. The apparatus of claim 29, wherein the mechanism to sequentially access the storage locations includes a plurality of second latches, within which a second portion of the enable signal is stored, wherein the second portion of the enable signal is used to select a portion of the selected word line.

31. The apparatus of claim 23, further comprising:
  a battery interface, operable to provide power to the one or more functional units.

32. The apparatus of claim 23, further comprising:
  a wireless medium interface, operable to enable signals to be sent to and received over a wireless medium.

33. The apparatus of claim 23, further comprising:
  a network interface, operable to enable signals to be sent to and received from a network.

34. The apparatus of claim 23, wherein the one or more functional units comprise:
  one or more functional units selected from a group of functional units that includes one or more floating-point units, multipliers, dividers, shifters, digital signal processors, co-processors, application specific integrated circuits, data processing engines, debug logic blocks, encryption units and key-generation units.

35. An apparatus comprising:
  one or more functional units;
  an instruction cache, which includes
    an array of storage locations, and
    a mechanism to sequentially access the storage locations within the array using an enable signal, which has a value that results from shifting information within one or more shift registers; and
  a processing engine, which is operable to access software instructions stored within the instruction cache, identify at least one functional unit from the one or more functional units based on a determination of whether a use counter corresponding to the one or more functional units contains a value not equal to a predetermined value, and send one or more special instructions to the at least one functional unit in order to execute at least one of the software instructions;
  a predecoder that is configured to evaluate software instructions, before or as the instruction is fetched into the instruction cache, to determine which functional units will be needed to execute at least one of the software instruction, and to adjust the use counter for each determined functional unit.

36. The apparatus of claim 35, wherein the mechanism to sequentially access the storage locations includes a plurality of first latches, within which a first portion of the enable signal is stored, and wherein the first portion of the enable signal is used to activate a selected word line within the array.

37. The apparatus of claim 36, wherein the mechanism to sequentially access the storage locations includes a plurality of second latches, within which a second portion of the enable signal is stored, wherein the second portion of the enable signal is used to select a portion of the selected word line.

38. The apparatus of claim 35, further comprising:
  one or more power controllers, which are operable to control whether or not an operable power level or a low power level is provided to selected ones of the one or more functional units, based on whether or not selected ones of the one or more functional units are operable to execute at least one software instruction stored within the instruction cache.

* * * * *